(12) United States Patent
Kon et al.

(10) Patent No.: US 9,567,217 B2
(45) Date of Patent: Feb. 14, 2017

(54) METHOD FOR PRODUCING DIFLUOROPHOSPHATE

(71) Applicant: STELLA CHEMIFA CORPORATION, Osaka (JP)

(72) Inventors: Sojiro Kon, Osaka (JP); Tetsuo Nishida, Osaka (JP)

(73) Assignee: Stella Chemifa Corporation, Osaka (JP)

( * ) Notice: Subject to any disclaimer, the term of this patent is extended or adjusted under 35 U.S.C. 154(b) by 0 days.

(21) Appl. No.: 14/419,071

(22) PCT Filed: Jun. 6, 2014

(86) PCT No.: PCT/JP2014/065100
§ 371 (c)(1),
(2) Date: Feb. 2, 2015

(87) PCT Pub. No.: WO2014/196632
PCT Pub. Date: Dec. 11, 2014

(65) Prior Publication Data
US 2016/0090306 A1    Mar. 31, 2016

(30) Foreign Application Priority Data

Jun. 7, 2013 (JP) .................. 2013-121330

(51) Int. Cl.
*C01B 25/455* (2006.01)
(52) U.S. Cl.
CPC .................. *C01B 25/455* (2013.01)
(58) Field of Classification Search
None
See application file for complete search history.

(56) References Cited

U.S. PATENT DOCUMENTS

| 2011/0111288 A1 | 5/2011 | Nishida et al. |
| 2011/0223089 A1 | 9/2011 | Nishida et al. |
| 2011/0223488 A1 | 9/2011 | Nishida et al. |

FOREIGN PATENT DOCUMENTS

| CN | 102036912 A | 4/2011 |
| DE | 813848 | 9/1951 |
| JP | 3439085 | 6/2003 |
| JP | 2005-053727 A | 3/2005 |
| JP | 2005-219994 A | 8/2005 |
| JP | 2005-306619 A | 11/2005 |
| JP | 2006-143572 A | 6/2006 |
| JP | 2010-155773 A | 7/2010 |
| JP | 2010-155774 A | 7/2010 |
| JP | 2012-51752 A | 3/2012 |
| WO | WO 2012/004187 A2 | 1/2012 |

OTHER PUBLICATIONS

Lange, "Über die Difluorphosphorsaure and ihre der Perchlorsäure ähnliche Salzbildung," Ber.Dtsch.Chem., Ges.B26, pp. 786-792 (1929).
Lange, Zh.Neorgan.Khim.,7, pp. 1313-1315 (1962).
Matsumoto et al., "A New Series of Ionic Liquids Based on the Difluorophosphate Anion," Inorganic Chemistry, vol. 48(15), pp. 7350-7358 (2009).
Matsumoto et al., "Properties of $PO_2F_2$-based ionic liquids as electrolytes for electric double layer capacitors," Proceedings of the 77th Electrochemical Society in Japan Jan. 18.
Schülke et al., Proceedings of 44th Japan Society for Analytical Chemistry, p. 536 (1994).
Semmoud et al., "Acide difluorophosphorique nouvelle preparation," *J. Fluor. Chem.*, vol. 46, pp. 1-6 (1990).
Thompson et al., "Preparation and infrared spectra of alkali metal difluorophosphates," *Inorg. Nucl. Chem. Letters*, vol. 5, pp. 581-585 (1969).
Vast et al., "Etude methodologique de la synthese des difluorodioxophosphates metalliques a partir de l'oxyde du difluorure de phosphoryle," *Journal of Fluorine Chemistry*, vol. 38, pp. 297-302 (1988).
Extended European Search Report dated Apr. 14, 2016, received in corresponding European Patent Application No. EP 14 80 7360.

*Primary Examiner* — Wayne Langel
(74) *Attorney, Agent, or Firm* — Knobbe Martens Olson & Bear LLP

(57) ABSTRACT

Provided is a method for producing a difluorophosphate, which can simply and easily produce a high-purity difluorophosphate in an industrially advantageous manner. The method includes steps of: reacting an aqueous hydrofluoric acid solution with an oxyhalide of phosphorous (except phosphoric trifluoride) to produce a crude difluorophosphoric acid; reacting the crude difluorophosphoric acid with a halide of an alkali metal, an alkaline earth metal, aluminum or an onium to produce a difluorophosphate in the crude difluorophosphoric acid; and heating and drying the crude difluorophosphoric acid containing the difluorophosphate to distill away the crude difluorophosphoric acid, or precipitating the difluorophosphate in the crude difluorophosphoric acid by crystallization, subsequently separating the difluorophosphate by solid-liquid separation, and further distilling away the crude difluorophosphoric acid contained in the difluorophosphate after solid-liquid separation.

8 Claims, No Drawings

METHOD FOR PRODUCING DIFLUOROPHOSPHATE

CROSS-REFERENCE TO RELATED APPLICATIONS

This application is the U.S. National Phase under 35 U.S.C. §371 of International Application PCT/JP2014/065100, filed Jun. 6, 2014, which claims priority to JP 2013-121330, filed Jun. 7, 2013.

TECHNICAL FIELD

The present invention relates to method for producing a difluorophosphate which can easily and industrially advantageously produce a high-purity difluorophosphate.

BACKGROUND ART

In recent years, investigations have been actively advanced for applying an ionic liquid as an electrolytic solution for batteries or electric double layer capacitors, and for using an ionic liquid as a plating bath. In conventional batteries or electric double layer capacitors, an aqueous electrolytic solution or an organic electrolytic solution has been used as an electrolytic solution. However, the aqueous electrolytic solution has the problem of being restricted about the decomposition voltage of water. The organic electrolytic solution has problems about heat resistance and safety. By contrast, an ionic liquid has characteristics preferable for safety, such as flame resistance and nonvolatility, and is also high in electrochemical stability. The ionic liquid is therefore suitable, in particular, for an electrolytic solution for batteries or electric double layer capacitors used in a high-temperature environment.

In order to use an ionic liquid as an electrolytic solution for batteries or electric double layer capacitors, investigations have been advanced about various types of ionic liquids each composed of a cation and an anion. For example, Non-Patent Document 1 reports properties of 1-ethyl-3-methylimidazolium difluorophosphate, which has a difluorophosphate as an anion, as an ionic liquid. Non-Patent Document 2 reports that the 1-ethyl-3-methylimidazolium difluorophosphate has electroconductivity and voltage resistance equivalent to those of 1-ethyl-3-methylimidazolium tetrafluoroborate, which is known as a typical ionic liquid, and can be suitably used for an electrolyte for electric double layer capacitors.

According to Non-Patent Document 1, in a method for producing the 1-ethyl-3-methylimidazolium difluorophosphate, the 1-ethyl-3-methylimidazolium difluorophosphate can be produced by reacting 1-ethyl-3-methylimidazolium chloride with potassium difluorophosphate in acetone, filtering off potassium chloride produced as a by-product from the solution in acetone, allowing the remaining solution to act onto an alumina column, and then distilling away acetone therefrom. Impurities in an electrolytic solution remarkably affect performances of batteries or electric double layer capacitors; thus, when an ionic liquid is used as an electrolytic solution, it is preferred to reduce impurities as much as possible. The ionic liquid is hardly volatile, and is also in a liquid state within a broad temperature range, so that the impurities are not easily reduced by a purifying method such as distillation or recrystallization. It is therefore necessary for synthesizing a high-purity ionic liquid to use a high-purity raw material. Thus, it is desired in the production method disclosed in Non-Patent Document 1 that the amount of impurities contained in potassium difluorophosphate to be used is as small as possible.

Methods for producing a difluorophosphate such as potassium difluorophosphate are disclosed in, for example, Patent Documents 1 to 8 and Non-Patent Documents 3 to 7 listed below.

Non-Patent Documents 3 and 4 each disclose a method of allowing ammonium fluoride or acidic sodium fluoride to act onto diphosphorous pentaoxide to provide a difluorophosphate. However, in the respective production methods disclosed in these documents, besides the difluorophosphate, a monofluorophosphate, a phosphate, and water are produced as by-products in large amounts. Accordingly, a large burden is imposed on a subsequent purifying step. Thus, it is not easily mentioned that these methods are effective methods.

Non-Patent Document 5 discloses a method of allowing $P_2O_3F_4$ (difluorophosphoric anhydride) to act onto, for example, an oxide or hydroxide such as $Li_2O$ or LiOH to produce a difluorophosphate. However, difluorophosphoric anhydride is very expensive, and high-purity difluorophosphoric anhydride is not easily available. Thus, this production method is disadvantageous for industrial production.

Patent Document 1 discloses a method of mixing potassium hexafluorophosphate with potassium metaphosphate, and melting the mixture to provide potassium difluorophosphate. However, this production method has the following problem: potassium difluorophosphate is contaminated by a crucible used at the time of melting potassium hexafluorophosphate and potassium metaphosphate. For the melting, it is also necessary to realize an environment of a high temperature such as 700° C. From the viewpoints of product purity and productivity, the production method disclosed in Patent Document 1 cannot be said to be a preferable method.

Non-Patent Document 6 discloses a method of melting urea, potassium dihydrogenphosphate, and ammonium fluoride to react these compounds with one another, thereby producing potassium difluorophosphate. In this production method, the reaction temperature can be lowered to about 170° C. In light of a comparison of this condition with reaction conditions in Patent Document 1, this production method makes it possible to realize industrial production. However, there remain the following problems: it is necessary to dispose of a large amount of ammonia gas produced as a by-product, and a large amount of ammonium fluoride also remains. Thus, from the viewpoints of production efficiency and product purity, the production method disclosed in Non-Patent Document 6 is not preferable, either.

Non-Patent Document 7 discloses a method of: reacting an alkali metal chloride with excessive difluorophosphoric acid; heating and drying hydrogen chloride, which is produced as a by-product, and a surplus of difluorophosphoric acid under reduced pressure to be distilled away; and then obtaining a difluorophosphate. However, even when difluorophosphoric acid sufficiently high in purity is used, a monofluorophosphate and a fluoride salt remain as impurities in large amounts in the difluorophosphate obtained by this method. It is therefore also difficult that the production method disclosed in Non-Patent Document 7 provides a high-purity difluorophosphate.

Patent Documents 2 to 4 each disclose a method of reacting lithium hexafluorophosphate with a borate, silicon dioxide and a carbonate in a nonaqueous solvent to provide lithium difluorophosphate. Moreover, Patent Document 5 discloses a method of bringing a carbonate or borate into contact with a gas such as phosphorous pentafluoride to provide lithium difluorophosphate. However, the production methods disclosed in these documents require a process over a long time of, for example, 40 to 170 hours for providing a difluorophosphate. Thus, these methods are unsuitable for industrial production.

Patent Document 6 describes a method of reacting an oxoacid or oxyhalide of phosphorous with a hexafluorophosphate, a halide of an alkali metal, and the like in the presence of hydrogen fluoride to provide a difluorophosphate. According to this method, the hexafluorophosphate acts, through the presence thereof, effectively onto contaminated water so that a high-purity difluorophosphate can be obtained. However, the hexafluorophosphate, which is expensive, is used in a relatively large amount, and further according to methods described in Examples therein, an exhaust gas or waste fluid containing a large amount of phosphorous and fluorine is generated to cause the following problem: the separation and recovery of useful substances, and waste disposal are complicated.

Patent Document 7 discloses a method of reacting a halide of an alkali metal or the like with difluorophosphoric acid in the presence of a hexafluorophosphate to produce a difluorophosphate. Patent Document 8 discloses a method of reacting difluorophosphoric acid with a halide or the like of an alkali metal in difluorophosphoric acid, and providing a difluorophosphate in difluorophosphoric acid by a crystallizing operation. In these production methods, it is necessary to use a high-purity difluorophosphoric acid. However, difluorophosphoric acid is high in corrosive property; thus, reduced pressure distillation or the like is required, and further facilities for the production are complicated. There is also caused the following problem: it is difficult to industrially gain difluorophosphoric acid regardless of the purity thereof.

In the meantime, a high-purity difluorophosphate can be used not only as a raw material of an ionic liquid but also as an additive for an electrolytic solution for lithium secondary batteries. In recent years, as a field to which lithium secondary batteries are applied enlarges from that of electronic instruments such as portable phones, personal computers and digital cameras to that of articles mounted on automobiles, a further rise in performances thereof has been advanced, for example, the power density and the energy density are improved, and a loss in the capacity is restrained. Lithium secondary batteries used, particularly, in articles mounted in automobiles may be exposed to a severer environment than ones used in consumer products; accordingly, the batteries are required to have a high reliability in terms of cycle life and storage performance. An electrolytic solution used in lithium secondary batteries is a nonaqueous electrolytic solution in which a lithium salt is dissolved in an organic solvent. The decomposition of such a nonaqueous electrolytic solution, and a side reaction thereof affect the performance of the lithium secondary batteries. Consequently, attempts have been made for improving the batteries in cycle life and storage performance by mixing various additives with the nonaqueous electrolytic solution.

For example, Patent Document 9 discloses that an organic solvent, as a nonaqueous electrolytic solution for lithium secondary batteries, contains at least one of lithium monofluorophosphate and lithium difluorophosphate as an additive. Patent Document 9 states that the use of such a nonaqueous electrolytic solution makes it possible to form a film onto a positive electrode and a negative electrode, respectively, thereby restraining the electrolytic solution from being decomposed by contact between the nonaqueous electrolytic solution, and a positive active material and a negative active material. Thus, the battery can be restrained from undergoing self-discharge and be improved in storage performance.

PRIOR ART DOCUMENTS

Patent Documents

Patent Document 1: German Patent No. 813848
Patent Document 2: JP-A-2005-53727
Patent Document 3: JP-A-2005-219994
Patent Document 4: JP-A-2005-306619
Patent Document 5: JP-A-2006-143572
Patent Document 6: JP-A-2010-155774
Patent Document 7: JP-A-2010-155773
Patent Document 8: JP-A-2012-51752
Patent Document 9: Japanese Patent No. 3439085

Non-Patent Documents

Non-Patent Document 1: K. Matsumoto and R. Hagiwara, Inorganic Chemistry, 2009, 48, 7350-7358
Non-Patent Document 2: The Electrochemical Society of Japan, 77$^{th}$ Conference, Proceedings, 1118
Non-Patent Document 3: Ber. Dtsch. Chem., Ges. B26 (1929) 786
Non-Patent Document 4: Zh. Neorgan. Khim., 7 (1962) 1313-1315
Non-Patent Document 5: Journal of Fluorine Chemistry, 38 (1988) 297-302
Non-Patent Document 6: The Japan Society for Analytical Chemistry, 43$^{th}$ Annual Convention, Summaries, 536 (1994)
Non-Patent Document 7: Inorganic Nuclear Chemistry Letters, Vol. 5 (1969) 581-585

SUMMARY OF THE INVENTION

Problems to be Solved by the Invention

The present invention has been made in light of the above-mentioned problems, and an object thereof is to provide a method for producing a difluorophosphate, which can easily and industrially advantageously produce a high-purity difluorophosphate.

Solutions to the Problems

In order to solve the problems in the prior art, the present inventors have investigated a method for producing a difluorophosphate. As a result, the present inventors have found out that by adopting the following configuration, a high-purity difluorophosphate can be synthesized by an industrially advantageous method. Thus, the present invention has been achieved.

In order to solve the above-mentioned problems, the method for producing a difluorophosphate, comprising: a step of reacting an aqueous hydrofluoric acid solution with an oxyhalide of phosphorous (except phosphoric trifluoride) to produce a crude difluorophosphoric acid, a step of reacting the crude difluorophosphoric acid with a halide of an alkali metal, an alkaline earth metal, aluminum or an onium to produce a difluorophosphate in the crude difluorophosphoric acid, and a step of heating and drying the crude difluorophosphoric acid containing the difluorophosphate to distill away the crude difluorophosphoric acid, or a step of precipitating the difluorophosphate in the crude difluorophosphoric acid by crystallization, subsequently separating the difluorophosphate by solid-liquid separation, and further distilling away the crude difluorophosphoric acid contained in the difluorophosphate after the solid-liquid separation.

In a conventional method for producing a difluorophosphate, it has been necessary to prepare, as a raw material thereof, a high-purity difluorophosphoric acid. However, difluorophosphoric acid is a raw material that is not industrially available with ease. Moreover, this acid is high in corrosivity, so that production facilities for distilling a crude acid thereof to a high purity under reduced pressure, and the like are also complicated. Therefore, it is not easy to produce a high-purity difluorophosphoric acid. However, according to the above configuration, it is unnecessary to prepare a high-purity difluorophosphoric acid beforehand, so that a difluorophosphate can be industrially produced by this method, which is a simpler and easier method than a conventional method.

Specifically, according to the above configuration, an oxyhalide of phosphorous is first reacted with an aqueous hydrofluoric acid solution to produce a crude difluorophosphoric acid. Thereafter, the resultant crude difluorophosphoric acid is reacted, without being made high in purity, with a halide of an alkali metal or the like. In this way, a difluorophosphate is produced in the crude difluorophosphoric acid.

Furthermore, in order to separate the difluorophosphate produced in the crude difluorophosphoric acid, this salt-containing acid is heated and dried to distill away the crude difluorophosphoric acid, or the following is performed: the difluorophosphate-produced crude difluorophosphoric acid is subjected to crystallizing operation to deposit a deposit; the deposit is separated from the crude difluorophosphoric acid by solid-liquid separation; and then the crude difluorophosphoric acid contained in the precipitation is distilled away. In this way, a high-purity difluorophosphate can be easily and simply produced by an industrially advantageous method.

Furthermore, in the above configuration, it is preferred that the step of reacting the aqueous hydrofluoric acid solution with the oxyhalide of phosphorous to produce a crude difluorophosphoric acid is performed by adding the aqueous hydrofluoric acid solution to the oxyhalide of phosphorous while the oxyhalide of phosphorous is cooled. The reaction between the oxyhalide of phosphorous and the aqueous hydrofluoric acid solution is conducted while these components are cooled, thereby restraining the evaporation of, for example, substances lower in boiling point in the crude difluorophosphoric acid obtained by the reaction, to prevent a substance having target composition from not being obtained. In short, by mixing the oxyhalide of phosphorous and the aqueous hydrofluoric acid solution with each other while cooling, the reactivity between the two can be controlled.

Moreover, in the above configuration, it is preferred that the halide of an alkali metal, an alkaline earth metal, aluminum or an onium is in the form of particles, and the maximum particle diameter thereof is less than 10 mm. When the maximum particle diameter is less than 10 mm, it is possible to prevent the contact area between the halide and the crude difluorophosphoric acid from being small to make the advance of the reaction slow. It is also possible to restrain the remaining amount of the halide of an alkali metal or the like in the synthesized difluorophosphate.

Furthermore, in the above configuration, it is preferred that the step for producing the difluorophosphate in the crude difluorophosphoric acid is performed by keeping the liquid temperature of the crude difluorophosphoric acid in the range of −40° C. to 100° C. at the time of adding the halide of an alkali metal, an alkaline earth metal, aluminum or an onium to the crude difluorophosphoric acid. When the temperature of the crude difluorophosphoric acid is kept at 100° C. or lower, the crude difluorophosphoric acid can be prevented from being deteriorated, and the difluorophosphate can be stably produced. The temperature of the crude difluorophosphoric acid is preferably −40° C. or higher. This makes it possible to prevent the crude difluorophosphoric acid from being increased in viscosity to prevent the stirring efficiency from being lowered. Thus, a halide acid produced as a by-product can be distilled away.

Moreover, in the above configuration, it is preferred that the following step is repeated: a step of adding, to the crude difluorophosphoric acid after the solid-liquid separation, a halide of an alkali metal, an alkaline earth metal, aluminum or an onium, and subsequently heating and drying the resultant system to distill away a surplus of the crude difluorophosphoric acid; or a step of separating a deposit deposited by crystallizing the crude difluorophosphoric acid containing the difluorophosphate by solid-liquid separation, and further distilling away the crude difluorophosphoric acid contained in the deposit. This makes it possible to reuse the crude difluorophosphoric acid separated by the solid-liquid separation again for reaction thereof with the halide of an alkali metal or the like. Thus, costs for the production can be decreased.

Effects of the Invention

The present invention produces the following effects by the configurations described above:

According to the present invention, an oxyhalide of phosphorous is reacted with an aqueous hydrofluoric acid solution to produce a crude difluorophosphoric acid, and subsequently the crude difluorophosphoric acid is reacted with a halide of an alkali metal, an alkaline earth metal, aluminum or an onium to produce a difluorophosphate in the crude difluorophosphoric acid. According to this method, it is made unnecessary to prepare a high-purity difluorophosphoric acid beforehand, so that a difluorophosphate can be produced more simply and more easily than according to the prior art.

Furthermore, according to the present invention, the crude difluorophosphoric acid in which the difluorophosphate is dissolved is heated and dried to distill away the crude difluorophosphoric acid. Alternatively, a difluorophosphate is deposited by crystallization, this deposit is separated from the crude difluorophosphoric acid by solid-liquid separation, and further the crude difluorophosphoric acid contained in the deposit is distilled away. It is therefore possible to simply and easily provide a high-purity difluorophosphate. Thus, the present invention is industrially advantageous. As a result, a difluorophosphate obtained by the method for producing a difluorophosphate of the present invention is very useful as, for example, an additive for a nonaqueous electrolytic solution for secondary batteries to make it possible to provide a secondary battery having excellent performances.

EMBODIMENTS OF THE INVENTION

An embodiment of the present invention will be described hereinafter.

The method for producing a difluorophosphate according to the present embodiment includes a step of producing a crude difluorophosphoric acid; a step of producing a difluorophosphate in the crude difluorophosphoric acid; and a step of heating and drying the crude difluorophosphoric acid containing the difluorophosphate to distill away a surplus of the crude difluorophosphoric acid, or a step of separating a deposit deposited in the crude difluorophosphoric acid by crystallizing operation, from the crude difluorophosphoric acid, by solid-liquid separation, and distilling away the crude difluorophosphoric acid contained in the deposit.

In the above-mentioned step of producing a crude difluorophosphoric acid, a step of reacting an aqueous hydrofluoric acid solution with an oxyhalide of phosphorous (except phosphoric trifluoride) (hereinafter referred to as the "oxyhalide") to produce a crude difluorophosphoric acid is performed.

The "crude difluorophosphoric acid" means a difluorophosphoric acid made mainly of difluorophosphoric acid and coexisting with hexafluorophosphoric acid, monofluorophosphoric acid, and the like. When the aqueous hydrofluoric acid solution is reacted with, for example, an oxyhalide represented by $POX_3$, a mixed solution is obtained which is made of difluorophosphoric acid and HX which is a by-product, as illustrated in the following chemical reaction formula (1):

[Formula 1]

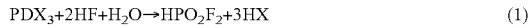

$$PDX_3 + 2HF + H_2O \rightarrow HPO_2F_2 + 3HX \quad (1)$$

wherein X is at least one of Cl, Br and I.

However, about difluorophosphoric acid, in a reaction system in which water or hydrogen fluoride is present, an equilibrium reaction exists as illustrated in the following chemical reaction formulae:

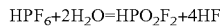

$$HPF_6 + 2H_2O = HPO_2F_2 + 4HF$$

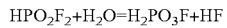

$$HPO_2F_2 + H_2O = H_2PO_3F + HF$$

$$H_2PO_3F + H_2O = H_3PO_4 + HF \quad [\text{Formula 2}]$$

Actually, therefore, the crude difluorophosphoric acid is produced, which is made mainly of difluorophosphoric acid that coexists with hexafluorophosphoric acid, monofluorophosphoric acid, and the like.

Components of the crude difluorophosphoric acid can be identified by ion chromatography or the like. Standard substances therefor are not easily available; thus, it is difficult to sufficiently quantitatively determine the respective concentrations of the various components. However, the relative ratio by area between ionic species detected can be used as respective indexes of the contained concentrations. About the composition of the crude difluorophosphoric acid quantitatively determined by such a method, preferably, the concentration of difluorophosphate ions is from 75 to 95%, that of fluoride ions is from 3 to 10%, and that of hexafluorophosphate ions is from 0.2 to 5%. The crude difluorophosphoric acid having such composition makes it possible to prevent a reduction in the reactivity between the crude difluorophosphoric acid and the halide of an alkali metal or the like to decrease the amount of an unreacted halide of an alkali metal or the like, remaining in the target difluorophosphate, and further to improve the producing efficiency of a high-purity difluorophosphate.

The oxyhalide is not particularly limited. Examples thereof include phosphoric trichloride, phosphoric tribromide, phosphoric dichloride fluoride, and diphosphoryl chloride. These may be used alone, or in any combination of two or more thereof. The oxyhalide herein is not trifluoride phosphate.

The concentration in the aqueous hydrofluoric acid solution is preferably from 50% to 90%, more preferably from 60 to 80%, in particular preferably from 65% to 75%. When the concentration in the aqueous hydrofluoric acid solution is set to 50% or more, the production of phosphate ions or monofluorophosphate ions in the crude difluorophosphoric acid produced can be adjusted. On the other hand, when the concentration in the aqueous hydrofluoric acid solution is set to 90% or less, the production of hexafluorophosphate ions in the crude difluorophosphoric acid produced can be adjusted.

It is preferred to perform the step of producing a crude difluorophosphoric acid while the system is cooled. Specifically, it is preferred that the reaction between the aqueous hydrofluoric acid solution and the oxyhalide is conducted by gradually mixing the two with each other while the system is cooled. The mixing is preferably performed by adding the aqueous hydrofluoric acid solution to the oxyhalide. This makes it possible to easily control the equilibrium reaction to synthesize the crude difluorophosphoric acid with target composition. However, in the present invention, the mixing manner is not limited to this. Thus, the oxyhalide may be added to the aqueous hydrofluoric acid solution. When there is a crude difluorophosphoric acid prepared beforehand, the oxyhalide and the aqueous hydrofluoric acid solution may be added to this crude difluorophosphoric acid. In this case, it is preferred to sufficiently cool the crude difluorophosphoric acid beforehand prepared. About the oxyhalide and the aqueous hydrofluoric acid solution, the addition-order thereof to the crude difluorophosphoric acid is not particularly limited. Thus, either one thereof may be earlier added.

When the system is cooed, the cooling temperature may be appropriately set in accordance with the types of the individual raw materials, or the mixing situation. In the case of using, for example, $POCl_3$ as the oxyhalide, the cooling temperature preferably ranges from −30° C. to 70° C., more preferably from −20° C. to 60° C., in particular preferably from −10° C. to 40° C. When the cooling temperature is set to −30° C. or higher, the system can be prevented from being increased in viscosity and thus being lowered in stirring efficiency. Thus, economical efficiency can also be improved. A halide acid produced as a by-product can also be distilled away. However, the freezing point of $POCl_3$ is about 1° C.; thus, when the system is cooled to the freezing point or lower before the addition of the aqueous hydrofluoric acid solution, the $POCl_3$ is frozen. However, after the addition of the aqueous hydrofluoric acid solution is started, $POCl_3$ is lowered in freezing point to come not to be frozen. It is therefore preferred to cool the system to about 5° C. before the addition of the aqueous hydrofluoric acid solution and further cool, after the addition of this solution, the system at a temperature in the above-mentioned temperature range while the situation at the time of mixing is observed. On the other hand, when the cooling temperature is set to 70° C. or lower, the reactivity between the oxyhalide of phosphorous and the aqueous hydrofluoric acid solution can be controlled. When the reactivity cannot be controlled, for example, local generation of heat is caused to volatilize components around the local site, the mass of the resultant crude difluorophosphoric acid is decreased relatively to the mass of the raw materials loaded (the total mass of the oxyhalide of phosphorous and the aqueous hydrofluoric acid solution), so that the yield may be lowered.

For example, in the case of adding the aqueous hydrofluoric acid solution to the oxyhalide, the cooling temperature means the temperature of the oxyhalide. In the case of adding, to the crude difluorophosphoric acid, the oxyhalide and the aqueous hydrofluoric acid solution, the cooling temperature means the temperature of the crude difluorophosphoric acid.

In the case of using, for example, $POBr_3$ as the oxyhalide, the cooling temperature preferably ranges from −10° C. to 70° C., more preferably from 0° C. to 60° C., in particular preferably from 5° C. to 50° C. However, the freezing point of $POBr_3$ is about 56° C.; and therefore, advantageous effects of the upper and lower limits about this raw material in the case are the same in the case of using $POCl_3$.

When the crude difluorophosphoric acid is produced, the cooling time is appropriately set as required in accordance with the relationship between the time and the cooling temperature. It is preferred to perform the cooling until the addition of the oxyhalide to the aqueous hydrofluoric acid solution is finished, until the addition of the aqueous hydrofluoric acid solution to the oxyhalide is finished, or until the addition of the aqueous hydrofluoric acid solution and the oxyhalide to the crude difluorophosphoric acid beforehand prepared is finished. More specifically, for example, the cooling time preferably ranges from 2 hours to 10 hours, more preferably from 3 hours to 8 hours, in particular preferably from 3.5 hours to 7.5 hours.

The reaction between the oxyhalide and the aqueous hydrofluoric acid solution may be conducted while reflux is performed. This makes it possible to improve the efficiency of the reaction between the two. About conditions for the reflux, the temperature of a reflux tower used therefor preferably ranges from −50° C. to 10° C., more preferably from −40° C. to 8° C., in particular preferably from −30° C. to 5° C.

The step of producing a difluorophosphate is performed by reacting the crude difluorophosphoric acid with a halide of an alkali metal, an alkaline earth metal, aluminum or an onium (hereinafter referred to as the "halide of an alkali metal or the like"). This reaction is conducted in the crude difluorophosphoric acid. This crude difluorophosphoric acid functions as a reaction solvent. As described in Patent Document 6, in a conventional method for producing a difluorophosphate, hydrogen fluoride is added to lithium hexafluorophosphate, lithium fluoride and diphosphorous pentaoxide to react these components with one another, thereby producing lithium difluorophosphate. In such a synthesis, however, there are caused inconveniences that the reaction advances very vigorously and the resultant lithium difluorophosphate is also unstable in quality. This is considered because local generation of heat, which is based on the vigorous reaction, causes unevenness in the temperature distribution inside the reaction vessel so that the reaction conditions are not easily stabilized. In the present embodiment, however, the crude difluorophosphoric acid beforehand synthesized is used as a reaction solvent to react this crude difluorophosphoric acid with the halide of an alkali metal or the like so as to reduce the generation of unevenness in the temperature distribution inside the reaction vessel, so that the reaction conditions can be stabilized. As a result, the resultant difluorophosphate can be made more stable in quality.

The halide of an alkali metal is not particularly limited. Examples thereof include fluoride, chloride, bromide, and iodide of Li, Na, K, Rb or Cs. These may be used alone or in any combination of two or more thereof.

The halide of an alkaline earth metal is not particularly limited. Examples thereof include fluoride, chloride, bromide, and iodide of Be, Mg, Ca, Sr or Ba. These may be used alone or in any combination of two or more thereof.

The halide of an onium is not particularly limited. Examples thereof include fluoride, chloride, bromide, and iodide of an ammonium, a phosphonium, or a sulfonium. These may be used alone or in any combination of two or more thereof. Examples of the ammonium include $NH_4^+$, secondary ammonium, tertiary ammonium, and quaternary ammonium. These may be used alone or in any combination of two or more thereof. Examples of the quaternary ammonium, out of these ammoniums, include tetraalkylammoniums (such as tetramethylammonium, tetraethylammonium, and triethylmethylammonium), imidazolium, pyrazolium, pyridinium, triazolium, pyridazinium, thiazolium, oxazolium, pyrimidinium, and pyrazinium. Examples of the phosphonium include tetraalkylphosphoniums (such as tetramethylphosphonium and tetraethylphosphonium). Examples of the sulfonium include trialkylsulfoniums (such as trimethylsulfonium and triethylsulfonium). In any of the oniums, these examples may be used alone or in any combination of two or more thereof.

The halide of an alkali metal or the like is preferably in the form of particles. The halide in the form of particles makes it possible to be increased in reactivity with the crude difluorophosphoric acid to reduce a remaining unreacted halide of an alkali metal or the like. As a result, a higher-purity difluorophosphate can be synthesized. The unreacted halide can be checked by analyzing the resultant difluorophosphate by ion chromatography, turbidimetry or the like.

The halide of an alkali metal, an alkaline earth metal, aluminum or an onium is in the form of particles. The shape and the size (particle diameter) thereof are not limited as far as these do not hinder the reactivity with the crude difluorophosphoric acid. The form of the particles may be the form of primary particles, which are each made of a single particle, or the form of secondary particles by aggregation of a plurality of primary particles. The particles of the halide may be particles obtained by granulating primary particles or secondary particles. In any of these cases, the maximum particle diameter of the particles is preferably less than 10 mm, more preferably 5 mm or less, even more preferably 1.5 mm or less, in particular preferably 1 mm or less. When the maximum particle diameter is set to less than 10 mm, the particles are increased in contact area with the crude difluorophosphoric acid so that the reaction can be prevented from advancing slowly. Moreover, the residual amount of the halide of an alkali metal or the like can be made small in the synthesized difluorophosphate. However, for example, in the case of loading the particles of an alkali metal or the like to the crude difluorophosphoric acid, the particle shape and the particle size (particle diameter) of the halide of an alkali metal or the like may be set, considering not only the reactivity with the crude difluorophosphoric acid, but also the powdery fluidity and other physical properties of the particles. In light of the scale of facilities, driving conditions thereof, and the like, the particle shape and the particle size (particle diameter) of the halide can be appropriately selected. The maximum particle diameter of the particles can be ascertained using a particle size distribution meter, a scanning electron microscope, or the like.

Furthermore, the water content by percentage in the halide of an alkali metal or the like is preferably less than 1%, more preferably 0.5% or less, in particular preferably 0.1% or less by mass of the whole of the halide. By setting the water content by percentage to less than 1% by mass, the crude difluorophosphoric acid can be restrained from being decomposed by water contained in the halide of an alkali metal or the like when the halide is mixed with the crude difluorophosphoric acid. Thus, a higher-purity difluorophosphate can be synthesized. The water content by percentage can be measured by a Karl Fischer moisture meter.

The reaction between the halide of an alkali metal or the like and the crude difluorophosphoric acid can be conducted by adding the crude difluorophosphoric acid to the halide of an alkali metal or the like. The reaction may be conducted by adding the halide of an alkali metal or the like to the crude difluorophosphoric acid. In light of the reaction situation, it is appropriately decidable whether the halide of an alkali metal or the like is added to the crude difluorophosphoric acid, or the latter is added to the former. For example, a predetermined amount thereof may be loaded at one time, or in plural portions. When the halide of an alkali metal or the like is added to the crude difluorophosphoric acid, the liquid temperature of the crude difluorophosphoric acid preferably ranges from −40° C. to 100° C., more preferably from −20° C. to 90° C., in particular preferably from −10° C. to 80° C. When the liquid temperature is set to 100° C. or lower, the crude difluorophosphoric acid can be prevented from being deteriorated. On the other hand, when the liquid temperature is set to −40° C. or higher, the reaction between the halide of an alkali metal or the like and the crude difluorophosphoric acid can be promoted.

Conditions for the reaction between the halide of an alkali metal or the like and the crude difluorophosphoric acid may be set at will. For example, the reaction temperature preferably ranges from 0° C. to 300° C., more preferably from 0° C. to 200° C., in particular preferably from 0° C. to 180° C. The reaction may be conducted under the atmospheric pressure, or under reduced pressure. Furthermore, the reaction time usually ranges from 0.5 hours to 5 hours. The time may be appropriately set in accordance with the reactor and the amounts loaded.

In order to heighten the reaction efficiency between the halide of an alkali metal or the like and the crude difluorophosphoric acid, reflux may be performed. About conditions for the reflux, the temperature of a reflux tower used therefor preferably ranges from −50° C. to 10° C., more preferably from −40° C. to 8° C., in particular preferably from −30° C. to 5° C.

The mixing ratio between the halide of an alkali metal or the like and the crude difluorophosphoric acid may be set in accordance with the step of distilling away the crude difluorophosphoric acid, to be performed after the present step. Specifically, the mixing ratio is varied in accordance with whether the step performed after the step of producing a difluorophosphate is the step of distilling away a surplus of the crude difluorophosphoric acid while heating and drying the reaction system, or the step of crystallizing the difluorophosphate in the crude difluorophosphoric acid, and then separating the deposit by solid-liquid separation, thereby distilling away the crude difluorophosphoric acid.

When the next step is the step of distilling away a surplus of the crude difluorophosphoric acid while heating and drying the reaction system, the ratio of the mole number of metal ions of the halide of an alkali metal or the like to that of difluorophosphoric acid in the crude difluorophosphoric acid, this ratio being represented by x, preferably satisfies $0.5 \leq x \leq 0.95$, more preferably $0.55 \leq x \leq 0.9$, and even more preferably $0.6 \leq x \leq 0.85$. When the value x is set to 0.5 or more, it is possible to prevent the amount of the crude difluorophosphoric acid to be distilled away from being increased relatively to the amount of the resultant difluorophosphate so that the production efficiency is lowered. On the other hand, when the value x is set to 0.95 or less, a remaining unreacted halide of an alkali metal or the like, as one of the raw materials, can be decreased.

When the next step is the step of performing the solid-liquid separation after the crystallization of the difluorophosphate, a fraction of the difluorophosphate that corresponds to a solubility difference in the crude difluorophosphoric acid depending on the temperature is recovered. The halide of an alkali metal or the like may be reacted with the crude difluorophosphoric acid in a molar amount corresponding to the saturated solubility of the difluorophosphate in the crude difluorophosphoric acid. Thus, the value x preferably satisfies $0.05 \leq x \leq 0.5$, more preferably $0.1 \leq x \leq 0.45$, in particular preferably $0.15 \leq x \leq 0.4$.

In the present embodiment, after the step of producing the difluorophosphate, the step of distilling away the remaining crude difluorophosphoric acid is performed. The method for distilling away the crude difluorophosphoric acid is either a method of heating and drying the crude difluorophosphoric acid including the difluorophosphate to distill away a surplus of the crude difluorophosphoric acid, or a method of depositing a deposit in the crude difluorophosphoric acid by crystallization, separating the deposit from the crude difluorophosphoric acid by solid-liquid separation, and distilling away the crude difluorophosphoric acid contained in the deposit.

In the former method, the heating temperature preferably ranges from 20° C. to 200° C., more preferably from 40° C. to 180° C., in particular preferably from 60° C. to 150° C. When the heating temperature is set to 20° C. or higher, the crude difluorophosphoric acid can be prevented from being insufficiently distilled away. On the other hand, when the heating temperature is set to 200° C. or lower, a problem about the durability of the drying machine can be avoided. The heating time is appropriately set as required in accordance with the heating temperature and other conditions. Specifically, the time preferably ranges from 2 hours to 35 hours, more preferably from 3 hours to 30 hours, in particular preferably from 4 hours to 25 hours.

The heating and drying are preferably performed under an atmosphere of an inert gas such as nitrogen or argon, or under a gas flow of an inert gas. This makes it possible to prevent the following: water in the atmosphere is dissolved in the crude difluorophosphoric acid to hydrolyze ions of the difluorophosphate so that impurities, such as monofluorophosphate ions or phosphate ions, are generated to cause a change in the composition. From the viewpoint of the drying machine used, the heating and drying are performed under normal pressure. However, in order to promote the distillation-off of a volatile substance (the crude difluorophosphoric acid), the drying may be performed under reduced pressure. From the viewpoint of drying efficiency, a mixing operation may be made, an example thereof being the vibrating, swinging or stirring of the crude difluorophosphoric acid including the difluorophosphate during drying.

In the latter method, the difluorophosphate in the crude difluorophosphoric acid is first crystallized. The crystallization is performed by heating or cooling the crude difluorophosphoric acid to make the difluorophosphate into a saturated state or a super saturated state. In this way, a crystal of the difluorophosphate is deposited in the crude difluorophosphoric acid. The crystallizing temperature may be appropriately set as required. Specifically, the temperature preferably ranges from −100° C. to 100° C., more preferably for −80° C. to 80° C., in particular preferably from −50° C. to 50° C.

After the crystal of the difluorophosphate is deposited, the resultant is subjected to solid-liquid separation. The solid-liquid separation is performed by, for example, filtration. The deposit thus obtained contains the crude difluorophosphoric acid used as a solvent for the crystallization. It is therefore necessary to remove the crude difluorophosphoric acid by heating and drying. In the present embodiment, impurities produced as by-products by the heating and drying can also be removed. At this time, the heating and drying temperature preferably ranges from 20° C. to 200° C., more preferably from 40° C. to 180° C., in particular preferably from 60° C. to 150° C. When the heating temperature is set to 20° C. or higher, the crude difluorophosphoric acid can be prevented from being insufficiently distilled away. On the other hand, when the heating temperature is set to 200° C. or lower, a problem about the durability of the drying machine can be avoided. The heating time is appropriately set as required in accordance with the heating temperature and other conditions. Specifically, the time preferably ranges from 2 hours to 35 hours, more preferably from 3 hours to 30 hours, in particular preferably from 4 hours to 25 hours.

Furthermore, the heating and drying are preferably performed in an atmosphere of an inert gas such as nitrogen or argon, or in a gas flow. This makes it possible to prevent water in the atmosphere from being dissolved in the crude difluorophosphoric acid so that the ratio between hydrogen atoms and oxygen atoms is changed to cause a change in the composition. The heating and drying are performed preferably under normal pressure from the viewpoint of a drying machine used therefor. However, in order to promote the distillation-off of the volatile substance (the crude difluorophosphoric acid), the drying may be performed under reduced pressure. From the viewpoint of drying efficiency, at the time of drying, a mixing operation may be made, an example thereof being the vibrating, swinging or stirring of the crude difluorophosphoric acid containing the difluorophosphate. This makes it possible to distill away the crude difluorophosphoric acid and impurities contained in the deposit to provide a high-purity difluorophosphate.

The crude difluorophosphoric acid obtained by the solid-liquid separation dissolves a non-deposited fraction of the difluorophosphate. For this reason, the crude difluorophosphoric acid after the solid-liquid separation can be reused. In the crude difluorophosphoric acid after the solid-liquid separation, the concentration of the difluorophosphate in the crude difluorophosphoric acid is lowered; thus, the reuse of this crude difluorophosphoric acid can be attained by adding thereto a raw-material salt (halide of an alkali metal or the like) corresponding to the amount lowered, or a raw-material salt and a crude difluorophosphoric acid. In this way, the crude difluorophosphoric acid and the halide of an alkali metal or the like are reacted with each other; and then in the same manner as described above, a step is repeated in which the crude difluorophosphoric acid containing the difluorophosphate is heated and dried to distill away a surplus of the crude difluorophosphoric acid. Alternatively, a step is repeated in which by crystallization, the difluorophosphate is deposited in the crude difluorophosphoric acid and then this salt is separated by solid-liquid separation, and subsequently the salt is heated and dried to distill away the crude difluorophosphoric acid. This makes it possible to efficiently produce a high-purity difluorophosphate.

In the present embodiment, any of the steps of the method for producing a difluorophosphate may be performed in the presence of an organic solvent. The use of an organic solvent may make it possible to produce advantageous effects of easily controlling the reactivity or the reaction conditions. For example, the step of producing a crude difluorophosphoric acid may be performed by bringing the oxyhalide of phosphorous into contact with a mixed solution of the aqueous hydrofluoric acid solution and an organic solvent. The step of producing a difluorophosphate may be performed by, for example, the addition of the halide of an alkali metal or the like to the mixed solution of the crude difluorophosphoric acid and an organic solvent.

The organic solvent used may be appropriately selected from the viewpoint of being reactive with neither the raw materials nor the reaction product, and being easily distilled away. Specifically, the organic solvent is not particularly limited as far as the solvent does not denature the reaction or the decomposition. Specific examples thereof include cyclic carbonates, linear carbonates, phosphates, cyclic ethers, linear ethers, lactone compounds, linear esters, nitrile compounds, amide compounds, sulfone compounds, and alcohols.

The cyclic carbonates are not particularly limited, and examples thereof include ethylene carbonate, propylene carbonate, and butylene carbonates. Of these cyclic carbonates, preferred are ethylene carbonate and propylene carbonate. The linear carbonates are not particularly limited, and examples thereof include dimethyl carbonate, ethylmethyl carbonate, and diethyl carbonate. Of these linear carbonates, preferred are dimethyl carbonate and ethylmethyl carbonate. The phosphates are not particularly limited, and examples thereof include trimethyl phosphate, triethyl phosphate, ethyldimethyl phosphate, and diethylmethyl phosphate. The cyclic ethers are not particularly limited, and examples thereof include tetrahydrofuran and 2-methyltetrahydrofuran. The linear ethers are not particularly limited, and examples thereof include dimethoxyethane. The lactone compounds are not particularly limited, and examples thereof include γ-butyrolactone. The linear esters are not particularly limited, and examples thereof include methyl propionate, methyl acetate, ethyl acetate, and methyl formate. The nitrile compounds are not particularly limited, and examples thereof include acetonitrile. The amide compounds are not particularly limited, and examples thereof include dimethylformamide. The sulfone compounds are not particularly limited, and examples thereof include sulfolane and methylsulfolane. The alcohols are not particularly limited, and examples thereof include methyl alcohol, ethyl alcohol, n-propyl alcohol, iso-propyl alcohol, butyl alcohol, and octyl alcohol. These organic solvents may be used alone or in the form of a mixture of two or more thereof. A solvent can be preferably used in which hydrogen atoms in a hydrocarbon group contained in the molecule of any of these organic solvents are at least partially substituted with one or more fluorine atoms.

EXAMPLES

Hereinafter, preferred examples of this invention will be exemplarily described in detail. However, the scope of this invention is not limited only into raw materials, blending amounts and others that are described in the examples, as far as the present specification does not include any restricted description thereabout.

Example 1

Sieving of Lithium Chloride

Lithium chloride (reagent manufactured by Wako Pure Chemical Industries, Ltd.) was subjected to sieving with a sieve (sieve opening size: 1.0 m) made of stainless steel. It was ascertained through a scanning electron microscope that the maximum particle diameter of the agglomerated particles was 1.0 mm or less.

Subsequently, the water content by percentage in the resultant lithium chloride was analyzed by Karl Fischer coulometry (trade name: AQ-2200, manufactured by Hiranuma Sangyo Corp.). The content by percentage was 0.1% by mass of the whole.

<Preparation of Crude Difluorophosphoric Acid>

Into a PFA vessel having an internal volume of 1 L was weighed 120.0 g of phosphoric trichloride (reagent manufactured by Wako Pure Chemical Industries, Ltd.), and this compound was cooled to 5° C. under a nitrogen atmosphere. Subsequently, 49.0 g of an aqueous hydrofluoric acid solution having a concentration of 71.6% was added to the phosphoric trichloride. The resultant was stirred at −10° C. for 3 hours while refluxed. Ion chromatography (trade name: ICS-1000, manufactured by Dionex Corp.; column AS-23) was used to subject the resultant crude difluorophosphoric acid to anion analysis. A relative area ratio of difluorophosphate ions was used as an index of the concentration of difluorophosphoric acid. In the resultant crude difluorophosphoric acid, the relative area concentration of the difluorophosphate ions was 87%, that of fluoride ions was 6%, and that of hexafluorophosphate ions was 2%.

<Synthesis of Lithium Difluorophosphate>

Into a PFA vessel having an internal volume of 1 L was weighed 100 g of the resultant crude difluorophosphoric acid. Thereto was added 33.3 g of the above-mentioned lithium chloride sieved, the maximum particle diameter thereof being 1 mm or less and the water content by percentage therein being 0.1% by mass of the whole. This reaction system was stirred at a normal temperature for 2 hours under a nitrogen atmosphere. Furthermore, while the stirring was continued under a nitrogen atmosphere, the temperature of the system was raised to 110° C. and the system was heated and dried for 7 hours. Thereafter, the system was cooled to room temperature to provide a crystal of lithium difluorophosphate.

Ion chromatography was used to subject the resultant crystal of lithium difluorophosphate to anion analysis. A relative area ratio of difluorophosphate ions was used as an index of the purity of lithium difluorophosphate. The purity of the resultant crystal of lithium difluorophosphate was 97% according to the relative area concentration. The amount of chloride ions contained in the resultant lithium difluorophosphate was measured by turbidimetry. As a result, the amount was less than 100 ppm.

Comparative Example 1

Distilling Purification of Difluorophosphoric Acid

Into a round bottom flask made of PTFE was weighed 400 g of a crude difluorophosphoric acid produced by the same method as described in Example 1, and this crude acid was distilled at 40° C. under reduced pressure to provide 354 g of a fraction in the round bottom PTFE flask cooled to −20° C. In the same way as in Example 1, ion chromatography was used to subject this fraction to anion analysis. The relative area concentration of difluorophosphate ions in the resultant acid difluorophosphoric acid was 97% and that of fluoride ions therein was 2%.

Lithium difluorophosphate was synthesized in the same way as in Example 1 except that difluorophosphoric acid obtained by the distilling operation was used. The purity of the resultant crystal of lithium difluorophosphate was 75% according to the relative area. The amount of chloride ions contained in the resultant lithium difluorophosphate was measured by turbidimetry. As a result, the amount was not less than 10,000 ppm.

Example 2

In the present example, lithium chloride was used which was in the form of agglomerated particles having a maximum particle diameter in the range of more than 1.0 mm and not more than 2.0 mm. In the same way as in Example 1 except for this, lithium difluorophosphate was synthesized. The lithium chloride used was sieved through two stainless-steel sieves having sieve opening sizes of 1.0 mm and 2.0 mmm, respectively.

Furthermore, in the same way as in Example 1, ion chromatography was used to subject the resultant crystal of lithium difluorophosphate to anion analysis. As a result, the purity of the crystal lithium difluorophosphate was 96% according to the relative area. The amount of chloride ions contained in the resultant lithium difluorophosphate was measured by turbidimetry. As a result, the amount was 100 ppm or more and less than 200 ppm.

Example 3

In the present example, lithium chloride was used which was in the form of agglomerated particles having a maximum particle diameter of more than 2.0 mm. In the same way as in Example 1 except for this, lithium difluorophosphate was synthesized. The lithium chloride was sieved through a stainless-steel sieve having a sieve opening size of 2.0 mmm.

Furthermore, in the same way as in Example 1, ion chromatography was used to subject the resultant crystal of lithium difluorophosphate to anion analysis. As a result, the purity of the crystal lithium difluorophosphate was 96% according to the relative area. The amount of chloride ions contained in the resultant lithium difluorophosphate was measured by turbidimetry. As a result, the amount was 200 ppm or more and less than 300 ppm.

Example 4

In the present example, lithium chloride was used which had a water content of 0.5% by mass of the whole. In the same way as in Example 1 except for this, lithium difluorophosphate was synthesized.

Furthermore, in the same way as in Example 1, ion chromatography was used to subject the resultant crystal of lithium difluorophosphate to anion analysis. As a result, the purity of the crystal lithium difluorophosphate was 95% according to the relative area. The amount of chloride ions contained in the resultant lithium difluorophosphate was measured by turbidimetry. As a result, the amount was less than 100 ppm.

Example 5

In the present example, the amount of lithium chloride added in synthesis of lithium difluorophosphate was changed to 25.0 g. In the same way as in Example 1 except for this, lithium difluorophosphate was synthesized.

Furthermore, in the same way as in Example 1, ion chromatography was used to subject the resultant crystal of lithium difluorophosphate to anion analysis. As a result, the purity of the crystal lithium difluorophosphate was 98% according to the relative area. The amount of chloride ions contained in the resultant lithium difluorophosphate was measured by turbidimetry. As a result, the amount was less than 100 ppm.

Example 6

In the present example, the amount of lithium chloride added in synthesis of lithium difluorophosphate was changed to 29.0 g. In the same way as in Example 1 except for this, lithium difluorophosphate was synthesized.

Furthermore, in the same way as in Example 1, ion chromatography was used to subject the resultant crystal of lithium difluorophosphate to anion analysis. As a result, the purity of the crystal lithium difluorophosphate was 98% according to the relative area. The amount of chloride ions contained in the resultant lithium difluorophosphate was measured by turbidimetry. As a result, the amount was less than 100 ppm.

Example 7

In the present example, the concentration of an aqueous hydrofluoric acid solution used to synthesize a crude difluorophosphoric acid was adjusted to 69.3%. Moreover, the amount of the aqueous hydrofluoric acid solution added was changed to 45.7 g. In the same way as in Example 1 except for these, a crude difluorophosphoric acid was synthesized.

In the same way as in Example 1, ion chromatography was used to subject the resultant crude difluorophosphoric acid to anion analysis. As a result, in the crude difluorophosphoric acid, the relative area concentration of difluorophosphate ions was 87%, that of fluoride ions was 5%, and that of hexafluorophosphate ions was 0.2%.

Furthermore, the crude difluorophosphoric acid was used to synthesize lithium difluorophosphate in the same way as in Example 1. Additionally, in the same way as in Example 1, ion chromatography was used to subject the resultant crystal of lithium difluorophosphate to anion analysis. As a result, the purity of the crystal lithium difluorophosphate was 95% according to the relative area. The amount of chloride ions contained in the resultant lithium difluorophosphate was measured by turbidimetry. As a result, the amount was less than 100 ppm.

Example 8

In the present example, the concentration of an aqueous hydrofluoric acid solution used to synthesize a crude difluorophosphoric acid was adjusted to 70.8%. Moreover, the amount of the aqueous hydrofluoric acid solution added was changed to 47.7 g. In the same way as in Example 1 except for these, a crude difluorophosphoric acid was synthesized.

In the same way as in Example 1, ion chromatography was used to subject the resultant crude difluorophosphoric acid to anion analysis. As a result, in the crude difluorophosphoric acid, the relative area concentration of difluorophosphate ions was 88%, that of fluoride ions was 4%, and that of hexafluorophosphate ions was 0.5%.

Furthermore, the crude difluorophosphoric acid was used to synthesize lithium difluorophosphate in the same way as in Example 1. Additionally, in the same way as in Example 1, ion chromatography was used to subject the resultant crystal of lithium difluorophosphate to anion analysis. As a result, the purity of the crystal lithium difluorophosphate was 96% according to the relative area. The amount of chloride ions contained in the resultant lithium difluorophosphate was measured by turbidimetry. As a result, the amount was less than 100 ppm.

Example 9

In the present example, the concentration of an aqueous hydrofluoric acid solution used to synthesize a crude difluorophosphoric acid was adjusted to 72.9%. Moreover, the amount of the aqueous hydrofluoric acid solution added was changed to 50.9 g. In the same way as in Example 1 except for these, a crude difluorophosphoric acid was synthesized.

In the same way as in Example 1, ion chromatography was used to subject the resultant crude difluorophosphoric acid to anion analysis. As a result, in the crude difluorophosphoric acid, the relative area concentration of difluorophosphate ions was 86%, that of fluoride ions was 7%, and that of hexafluorophosphate ions was 3%.

Furthermore, the crude difluorophosphoric acid was used to synthesize lithium difluorophosphate in the same way as in Example 1. Additionally, in the same way as in Example 1, ion chromatography was used to subject the resultant crystal of lithium difluorophosphate to anion analysis. As a result, the purity of the crystal lithium difluorophosphate was 96% according to the relative area. The amount of chloride ions contained in the resultant lithium difluorophosphate was measured by turbidimetry. As a result, the amount was less than 100 ppm.

Example 10

In the present example, the concentration of an aqueous hydrofluoric acid solution used to synthesize a crude difluorophosphoric acid was adjusted to 73.5%. Moreover, the amount of the aqueous hydrofluoric acid solution added was changed to 51.5 g. In the same way as in Example 1 except for these, a crude difluorophosphoric acid was synthesized.

In the same way as in Example 1, ion chromatography was used to subject the resultant crude difluorophosphoric acid to anion analysis. As a result, in the resultant crude difluorophosphoric acid, the relative area concentration of difluorophosphate ions was 85%, that of fluoride ions was 10%, and that of hexafluorophosphate ions was 4%.

Furthermore, the crude difluorophosphoric acid was used to synthesize lithium difluorophosphate in the same way as in Example 1. Additionally, in the same way as in Example 1, ion chromatography was used to subject the resultant crystal of lithium difluorophosphate to anion analysis. As a result, the purity of the crystal lithium difluorophosphate was 95% according to the relative area. The amount of chloride ions contained in the resultant lithium difluorophosphate was measured by turbidimetry. As a result, the amount was less than 100 ppm.

Example 11

In the present example, a crude difluorophosphoric acid was first prepared in the same way as in Example 1. Subsequently, 100 g of the resultant crude difluorophosphoric acid was weighed into a PFA vessel having an internal volume of 1 L. Thereto was added 8.3 g of the above-mentioned lithium chloride sieved, the maximum particle diameter thereof being 1 mm or less and the water content by percentage therein being 0.1% by mass. This reaction system was stirred at a normal temperature for 2 hours under a nitrogen atmosphere. Subsequently, the resultant reaction liquid was filtrated to remove insoluble components therein. Furthermore, the resultant filtrate was cooled from the normal temperature to −30° C. to deposit a deposit. This slurry was subjected to solid-liquid separation. The resultant crystal was heated and dried under a nitrogen atmosphere at 110° C. for 7 hours. Thereafter, the system was cooled to room temperature to provide a crystal of lithium difluorophosphate.

Next, in the same as in Example 1, ion chromatography was used to subject the resultant crystal of lithium difluorophosphate to anion analysis. As a result, the purity of the resultant crystal of lithium difluorophosphate was 98% according to the relative area. The amount of chloride ions contained in the resultant lithium difluorophosphate was measured by turbidimetry. As a result, the amount was less than 100 ppm.

Example 12

In the present example, 224.4 g of phosphoric tribromide (reagent manufactured by Sigma-Aldrich Corp.) was weighed into a PFA vessel having an internal volume of 1 L, and then the system was heated to 60° C. under a nitrogen atmosphere. Subsequently, 49.0 g of an aqueous hydrofluoric acid solution having a concentration of 71.6% was added to the phosphoric tribromide, and then the resultant liquid was stirred for 3 hours while refluxed at −10° C. Ion chromatography was used to subject the resultant crude difluorophosphoric acid to anion analysis. As a result, in the resultant crude difluorophosphoric acid, the relative area concentration of difluorophosphate ions was 87%, that of fluoride ions was 5%, and that of hexafluorophosphate ions was 2%.

Furthermore, the resultant crude difluorophosphoric acid was used to synthesize lithium difluorophosphate in the same way as in Example 1. As a result, the purity of lithium difluorophosphate was 96% according to the relative area. The respective amounts of chloride ions and bromide ions contained in the resultant lithium difluorophosphate were measured by turbidimetry. As a result, the amount of each of the two types of ions was less than 100 ppm.

Example 13

In the present example, 100 g of the crude difluorophosphoric acid prepared in Example 1 and 170 g of dimethyl carbonate were weighed into a PFA vessel having an internal volume of 1 L. Thereto was further added 33.3 g of lithium chloride, the maximum particle diameter of agglomerated particles thereof being more than 2.0 mm and the water content by percentage therein being 0.1% by mass. This reaction system was stirred under a nitrogen atmosphere at a normal temperature for 2 hours. The lithium chloride used was a salt sieved through a stainless-steel sieve having a sieve opening size of 2.0 mm. The slurry thus obtained was subjected to solid-liquid separation to provide a crystal. Furthermore, this crystal was heated and dried at 110° C. for 7 hours under a nitrogen atmosphere. Thereafter, the system was cooled to room temperature to provide a crystal of lithium difluorophosphate.

Furthermore, ion chromatography was used to subject the resultant crystal of lithium difluorophosphate to anion analysis in the same way as in Example 1. As a result, the purity of the crystal lithium difluorophosphate was 97% according to the relative area. The amount of chloride ions contained in the resultant crystal lithium difluorophosphate was measured by turbidimetry. As a result, the amount was less than 100 ppm.

Example 14

In the present example, 49.0 g of an aqueous hydrofluoric acid solution having a concentration of 71.6% was weighed into a PFA vessel having an internal volume of 1 L, and the system was cooled to 5° C. under a nitrogen atmosphere. Subsequently, to the aqueous hydrofluoric acid solution was added 120.0 g of phosphoric trichloride. The resultant liquid was then stirred for 3 hours while refluxed at −10° C. Ion chromatography was used to subject the resultant crude difluorophosphoric acid to anion analysis in the same way as in Example 1. As a result, in the resultant crude difluorophosphoric acid, the relative area concentration of difluorophosphate ions was 60%, that of fluoride ions was 11%, and that of hexafluorophosphate ions was 2%.

Furthermore, lithium difluorophosphate was synthesized in the same way as in Example 1 except that the resultant crude difluorophosphoric acid was used and the amount of lithium chloride added was changed to 23.0 g in the synthesis of the lithium difluorophosphate. As a result, the purity of lithium difluorophosphate was 85% according to the relative area. The amount of chloride ions contained in the resultant lithium difluorophosphate was measured by turbidimetry. As a result, the amount thereof was less than 100 ppm.

Comparative Example 2

In the present example, 50.0 g of phosphoric trichloride was first weighed into a PFA vessel having an internal volume of 1 L. Thereto was added 11.0 g of lithium chloride, the maximum particle diameter of agglomerated particles thereof being not more than 1.0 mm and the water content by percentage therein being 0.1% by mass. The lithium chloride used was a salt sieved through a stainless-steel sieve having a sieve opening size of 1.0 mm. Subsequently, thereto was added 20.3 g of an aqueous hydrofluoric acid solution having a concentration of 71.6%, and the resultant liquid was stirred at a normal temperature for 2 hours under a nitrogen atmosphere. Furthermore, while the stirring was continued under the nitrogen atmosphere, the temperature of the system was raised to 110° C. The liquid was then heated and dried for 7 hours. Thereafter, the system was cooled to room temperature to provide a crystal of lithium difluorophosphate.

Furthermore, ion chromatography was used to subject the resultant crystal of lithium difluorophosphate to anion analysis in the same way as in Example 1. As a result, the purity of lithium difluorophosphate was 79% according to the relative area. The amount of chloride ions contained in the resultant crystal lithium difluorophosphate was measured by turbidimetry. As a result, the amount was not less than 10,000 ppm.

What is claimed is:

1. A method for producing a difluorophosphate, comprising:
    a step of reacting an aqueous hydrofluoric acid solution with an oxyhalide of phosphorous (except phosphoric trifluoride) to produce a crude difluorophosphoric acid,
    a step of reacting the crude difluorophosphoric acid with a halide of an alkali metal, an alkaline earth metal, aluminum or an onium to produce a difluorophosphate in the crude difluorophosphoric acid, and
    a step of heating and drying the crude difluorophosphoric acid containing the difluorophosphate to distill away the crude difluorophosphoric acid, or a step of precipitating the difluorophosphate in the crude difluorophosphoric acid by crystallization, subsequently separating the difluorophosphate by solid-liquid separation, and further distilling away the crude difluorophosphoric acid contained in the difluorophosphate after the solid-liquid separation.

2. The method for producing a difluorophosphate according to claim 1, wherein the step of reacting the aqueous hydrofluoric acid solution with the oxyhalide of phosphorous to produce a crude difluorophosphoric acid is performed by adding the aqueous hydrofluoric acid solution to the oxyhalide of phosphorous while the oxyhalide of phosphorous is cooled.

3. The method for producing a difluorophosphate according to claim 1, wherein the halide of an alkali metal, an alkaline earth metal, aluminum or an onium is in the form of particles, and the maximum particle diameter thereof is less than 10 mm.

4. The method for producing a difluorophosphate according to claim 1, wherein the step for producing the difluorophosphate in the crude difluorophosphoric acid is performed by keeping the liquid temperature of the crude difluorophosphoric acid in the range of −40° C. to 100° C. at the time of adding the halide of an alkali metal, an alkaline earth metal, aluminum or an onium to the crude difluorophosphoric acid.

5. The method for producing a difluorophosphate according to claim 1, wherein the following step is repeated: a step of adding, to the crude difluorophosphoric acid after the solid-liquid separation, a halide of an alkali metal, an alkaline earth metal, aluminum or an onium, and subsequently heating and drying the resultant system to distill away a surplus of the crude difluorophosphoric acid; or a step of separating a deposit deposited by crystallizing the crude difluorophosphoric acid containing the difluorophosphate by solid-liquid separation, and further distilling away the crude difluorophosphoric acid contained in the deposit.

6. The method for producing a difluorophosphate according to claim 2, wherein the halide of an alkali metal, an alkaline earth metal, aluminum or an onium is in the form of particles, and the maximum particle diameter thereof is less than 10 mm.

7. The method for producing a difluorophosphate according to claim 6, wherein the step for producing the difluorophosphate in the crude difluorophosphoric acid is performed by keeping the liquid temperature of the crude difluorophosphoric acid in the range of −40° C. to 100° C. at the time of adding the halide of an alkali metal, an alkaline earth metal, aluminum or an onium to the crude difluorophosphoric acid.

8. The method for producing a difluorophosphate according to claim 7, wherein the following step is repeated: a step of adding, to the crude difluorophosphoric acid after the solid-liquid separation, a halide of an alkali metal, an alkaline earth metal, aluminum or an onium, and subsequently heating and drying the resultant system to distill away a surplus of the crude difluorophosphoric acid; or a step of separating a deposit deposited by crystallizing the crude difluorophosphoric acid containing the difluorophosphate by solid-liquid separation, and further distilling away the crude difluorophosphoric acid contained in the deposit.

* * * * *